United States Patent [19]
Galloup

[11] 4,195,401
[45] Apr. 1, 1980

[54] CONDUCTOR UNWRAPPING BIT

[75] Inventor: Clifford L. Galloup, Reed City, Mich.

[73] Assignee: Cooper Industries, Inc., Houston, Tex.

[21] Appl. No.: 925,894

[22] Filed: Jul. 19, 1978

Related U.S. Application Data

[63] Continuation-in-part of Ser. No. 849,293, Nov. 7, 1977, abandoned.

[51] Int. Cl.[2] ........................ B21F 21/00; B23P 19/04
[52] U.S. Cl. ........................ 29/764; 140/123; 140/124
[58] Field of Search .................. 29/751, 764; 140/118, 140/119, 123, 124; 242/7.06, 7.17

[56] References Cited

U.S. PATENT DOCUMENTS

| | | | |
|---|---|---|---|
| 2,804,887 | 9/1957 | Reck | 140/123 |
| 2,898,952 | 8/1959 | Lovecky | 140/124 X |
| 2,998,034 | 8/1961 | Mann et al. | 140/123 |
| 3,019,517 | 2/1962 | Lovecky | 29/764 X |
| 3,378,906 | 4/1968 | Dorsey | 140/124 X |
| 3,521,678 | 7/1970 | Petree | 140/123 |
| 3,670,784 | 6/1972 | Ackerman | 140/118 |
| 3,788,367 | 1/1974 | Ackerman | 140/124 |
| 3,866,846 | 2/1975 | Dorsey | 242/7.06 |
| 3,903,935 | 9/1975 | Boothby | 140/124 |
| 3,994,320 | 11/1976 | Dorsey et al. | 140/124 |
| 4,064,581 | 12/1977 | Kober | 242/7.17 X |
| 4,111,242 | 9/1978 | Jacobson et al. | 140/124 |

FOREIGN PATENT DOCUMENTS 1034582 6/1966 United Kingdom .

*Primary Examiner*—Ervin M. Combs
*Attorney, Agent, or Firm*—Michael E. Martin

[57] ABSTRACT

An unwrapping bit for solderless wrapped connections of flexible conductor wire comprising a tubular member having a conical recess in one end face and a terminal receiving bore coaxial with the conical recess. Opposed longitudinal slots as well as transverse slots in the bit intersect the recess and form ledges for engaging the coiled end of a flexible conductor wire. The conical recess may have a reentrant shoulder portion adjacent the bit end face for retaining the conductor wire coils in the recess as they are unwound from the terminal.

4 Claims, 15 Drawing Figures

CONDUCTOR UNWRAPPING BIT

BACKGROUND OF THE INVENTION

This application is a continuation-in-part of applicant's prior copending application Ser. No. 849,293, filed Nov. 7, 1977 and now abandoned.

This invention pertains to devices for removing flexible conductor wires from terminals wherein a connection is formed by coiling the wire tightly around a terminal pin in a series of helical convolutions. Such connections are sometimes referred to as solderless wrapped connections.

One of the advantages of solderless wrapped connections is that the conductor may be easily removed from the terminal and later reconnected to the same or a replacement terminal without damaging the conductor or the terminal themselves. Accordingly, tools have been developed which unwrap the helical convolutions of conductor wire or suitably enlarge the wire coils so that the conductor may be removed from the terminal pin. One type of unwrapping tool is that disclosed in U.S. Pat. Nos. 2,804,887 to F. Reck and 3,866,846 and 3,994,320 to T. C. Dorsey wherein a helical groove or flute is formed on the end of a tubular bit. The wrapped conductor is engaged by the tool in such a way that the end of the conductor is directed into he helical groove and the tool is rotated to progressively loosen each helical convolution.

Another type of prior art unwrapping tool is characterized by internally threaded jaws which may be fixed or movable. The threads or grooves formed in the jaws are helical and the jaws are adapted to encircle and grip the wire coils while the tool is rotated. A tool of the above described type is disclosed in U.S. Pat. No. 2,898,952 to A. J. Lovecky.

The types of tools mentioned hereinbefore while generally capable of performing their intended function have proved to be somewhat difficult to apply to the connection in such a way as to properly engage the end of the conductor wire for loosening and removing the wire coils. Prior art unwrapping tools or bits also tend to break or damage the wire in the process of removing it from the terminal. The sharp wedge shaped end of the tools such as disclosed in the Reck and Dorsey patents tend to break off small chips from the end of the wire or scrape metallic coatings therefrom as they engage the coiled connection. Moreover, the threaded jaw type tools are somewhat difficult to properly engage with the coiled wire connection which makes them slow to use as well as potentially damaging to the conductor wire if the coils are not properly engaged. The present invention substantially alleviates the abovementioned problems with prior art unwrap bits or tools as well as providing a bit which is structurally uncomplicated and economical to manufacture.

SUMMARY OF THE INVENTION

The present invention provides for an improved tool or bit for removing coiled or wrapped flexible conductors from terminal pins wherein the bit may be applied to the connection and rotated to engage and loosen the tightly wound coils of conductor wire with little risk of damaging or breaking the wire or the terminal.

The present invention also provides for a bit for removing wrapped electrical conductors from terminal pins wherein the bit may be easily located in proper position to engage and contain the helical coils or convolutions of conductor wire for loosening the coils to remove the wire from the terminal pin. Thanks to the conical recess and coaxial terminal receiving bore provided in the conductor unwrapping bit of the present invention solderless wrapped connections may be more easily engaged by the bit and removed with greater speed than has heretofore been possible.

The present invention further provides for a bit for removing solderless wrapped flexible conductor wires from terminals wherein the bit has improved means for holding the conductor wire in engagement with the bit as the wire is removed from the terminal so that the wire is not severely stressed, or otherwise damaged deyond its ability to be reused.

The present invention still further provides a conductor unwrapping bit that may be used for removing wrapped flexible conductors which are coiled on a terminal regardless of the "hand" or direction of coiling.

The above advantages and prominent features of the present invention have been realized with a bit which is structurally uncomplicated and relatively inexpensive to manufacture.

DESCRIPTION OF THE PREFERRED EMBODIMENTS

Figure 1:
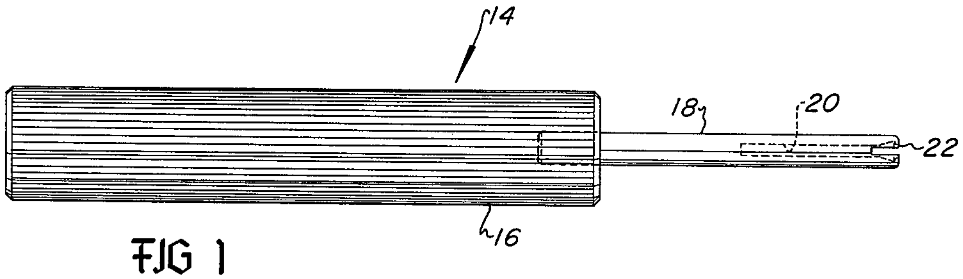
FIG. 1 is a longitudinal side elevation of a tool in accordance with the present invention for removing wrapped connections of conductor wire from terminals.

Referring to FIG. 1 an exemplary manual conductor unwrapping tool is shown and generally designated by the numeral 14. The tool 14 includes an elongated cylindrical handle portion 16 which is provided with suitable grooving on its exterior surface to improve its handling qualities. The tool 14 is further characterized by an elongated cylindrical shank or bit 18 preferably made of hardenable steel, which may be attached to the handle 16 by an interference fitting of one end of the bit in a suitable bore in the handle. It will be appreciated that the bit 18 and alternate embodiments thereof may be adapted to be used with power operated tools or driving mechanisms as well as the manual tools disclosed by way of example herein.

Figure 2:
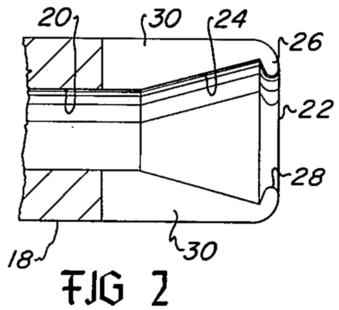
FIG. 2 is a partial side view, in section, of the bit used in the tool of FIG. 1.
Figure 3:
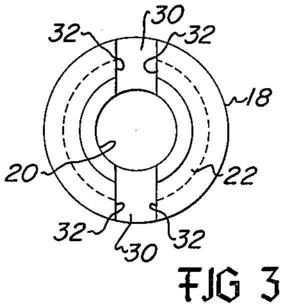
FIG. 3 is an end view of the bit shown in FIG. 2.
Figure 4:
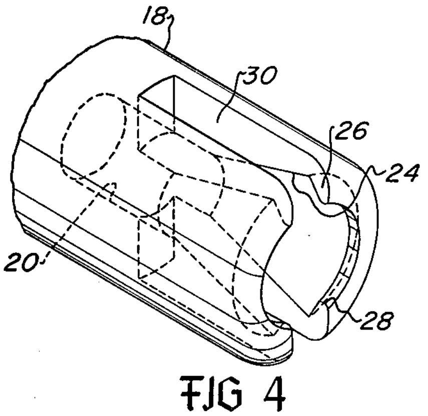
FIG. 4 is a perspective view of the bit end shown in FIGS. 2 and 3.

Referring to FIGS. 2, 3, and 4 also, the bit 18 is characterized by a central longitudinal bore 20 which opens toward a transverse end face 22 opposite the end of the bit which is secured in the handle 16. The bit 18 is further characterized by a generally smooth walled conical recess 24 which converges in a direction away from the end face 22 and toward its intersection with the bore 20. The conical recess 24 is preferably formed with approximately a 30° included angle and is also substantially coaxial with the bore 20. The divergent end of the conical recess 24 is delimited by an inwardly projecting annular rim 26 having a curved surface 28 defining its radially innermost edge with respect to the longitudinal central axis of the bit 18. The innermost edge of the rim 26 defines an opening in the end face 22 of the bit which is slightly larger in diameter than the maximum diameter of a wrapped connection of a conductor for which the bit 18 would be adapted to remove from a terminal pin.

The bit 18 is also provided with two opposed longitudinal slots 30 which open to the end face 22 and to the conical recess 24. The longitudinal surfaces 32 defining the slots 30 serve as ledges for engaging the end of the conductor for loosening the coils or helical convolutions so that the conductor may be easily pulled off of the terminal.

Figure 5:
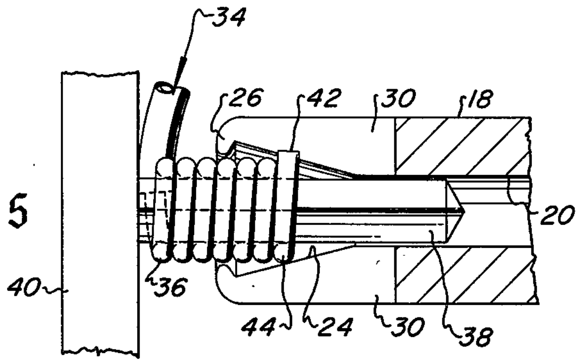
FIGS. 5 through 7 are views showing in sequence the bit of FIGS. 1 through 4 being applied to a wrapped connection and removing the conductor wire from a terminal.
Figure 6:
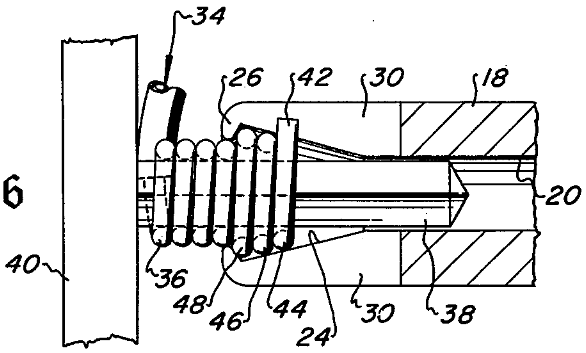
Figure 7:
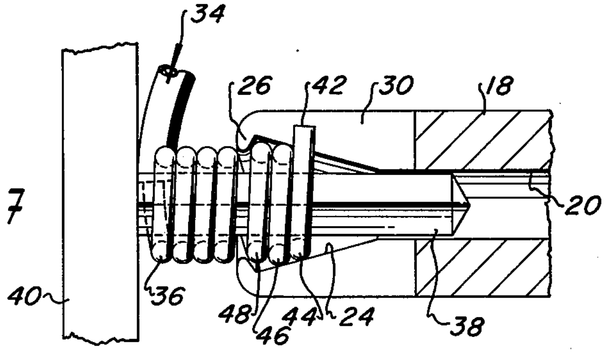

Referring to FIGS. 5, 6, and 7 the operation of the bit 18 to remove a conductor wire from a terminal is shown in three sequential steps or conditions of the conductor removal process. In FIG. 5 there is shown a typical solderless wrapped electrical connection comprising a flexible insulated conductor wire, generally designated by the numeral 34 and having a portion 36 from which insulation has been removed. The conductor portion 36 is wrapped tightly in a series of coils or helical convolutions about a terminal pin 38 which is firmly connected to a base 40. In the normal process of coiling the conductor 36 about the terminal 38 the distal end 42 may project slightly away from the terminal as shown in FIG. 5 after the connection has been completed.

In the operation of the bit 18 to remove the conductor 36 from the terminal 38, the bit is first disposed over the terminal as shown in FIG. 5 until the end convolution or coil 44 is engaged with the wall of the recess 24 and the terminal 38 projects into the bore 20. If, on applying the bit to the terminal 38, the end 42 of the conductor is found to be projecting too far radially outwardly to permit disposing one or more coils within the recess 24, then the bit may be rotated in the direction of the wrap of the coils while applying slight axial pressure toward the conductor to force the end 42 radially inwardly until the opening formed by the rim 26 clears the conductor or until the end 42 slips into one of the slots 30 so that the bit aassumes the position shown in FIG. 5 with the end 42 engageable with one of the surfaces 32.

When the bit 18 is disposed over the wrapped conductor 36 as shown in FIG. 5 the tool 14 is rotated in the direction opposite to the direction of coiling of the conductor wire whereby, as a consequence of the end 42 being engaged by a surface 32, the coil 44 as well as coils 46 and 48 will be successively loosened from the terminal and enlarged to become engaged with the conical recess 24 as shown in FIG. 6.

Continued rotation of the tool 14 will enlarge all of the coils or helical convolutions of the conductor 36 as shown in FIG. 7 whereupon the conductor may be easily removed from the terminal. Thanks to the reentrant annular rim 26 the conductor 36 will remain firmly engaged with the bit 18 as it is removed from the terminal 38. After complete removal from the terminal the conductor 36 may be manually removed from the recess 24 by deforming the coils within the recess or by winding the conductor to tighten the coils and thereby reduce their diameter.

As may be appreciated from the above description, the bit 18 may be easily applied to a solderless wrapped connection of flexible conductor wire and operated to remove the conductor from a terminal with minimal risk of damaging either the conductor or the terminal. Moreover, the bit 18 may be used to remove the conductor regardless of the direction in which the wire is coiled on the terminal due to the opposed surface 32 forming the slot 30. Although the bit 18 could function well with only one slot 30, the provision of two opposed slots reduces the amount of turning of the bit which is necessary to engage the conductor for commencing the removal operation.

Figure 8:
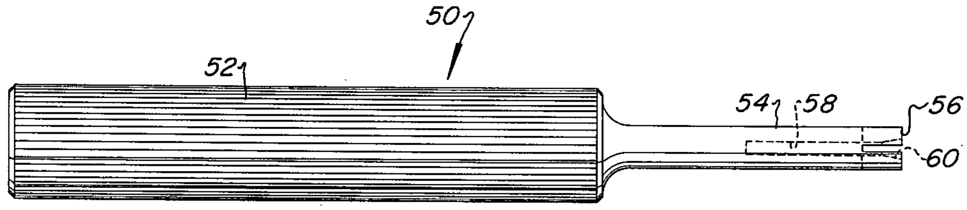
FIG. 8 is a longitudinal side elevation of a tool employing a bit in accordance with an alternate embodiment of the present invention.
Figure 9:
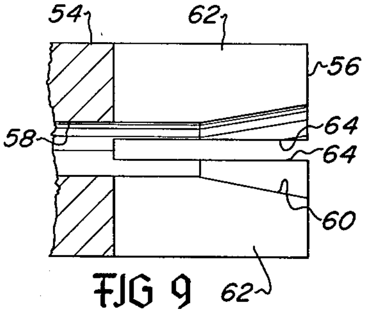
FIG. 9 is a partial side view, in section, of the embodiment of a conductor removing bit of FIG. 8.
Figure 10:
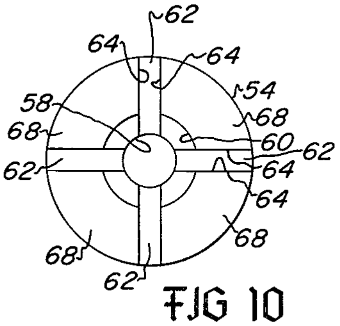
FIG. 10 is an end view of the bit shown in FIG. 9.
Figure 11:
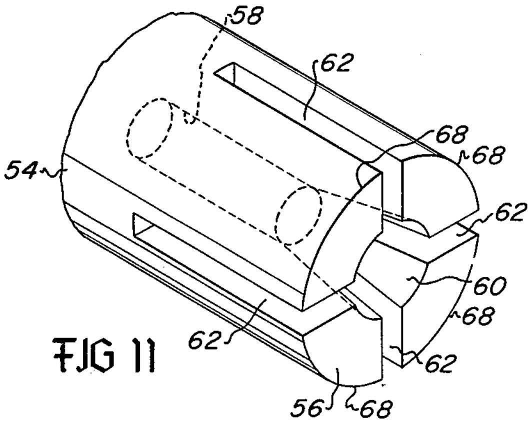
FIG. 11 is a perspective view of the bit end shown in FIGS. 9 and 10.

An alternate embodiment of a tool for removing solderless wrapped connections is shown in FIG. 8 through 13. Referring to FIG. 8 a tool 50 includes a cylindrical handle portion 52 and an integrally formed elongated cylindrical shank comprising a conductor unwrapping bit 54. The bit 54 includes a transverse end face 56 and a central longitudinal terminal receiving bore 58. A smooth walled conical recess 60 is formed in the bit 54 and opens at its divergent end to the end face 56. The conical recess 60 is preferably formed to have approximately a 30° included angle and is coaxial with and intersects the terminal receiving bore 58. The bit 54 is also provided with four equally spaced radial and longitudinally extending slots 62 which as may be noted from FIG. 9 extend longitudinally from the end face 56 approximately twice the distance of the recess 60. The slots 62, in addition to forming opposed longitudinal surfaces 64 for engaging the distal end of the conductor wire, also divide the inner wall surface of the recess 60 into four segments which function as jaws 68 for engaging and containing the wire coils as the conductor is unwrapped from a terminal.

Figure 12:
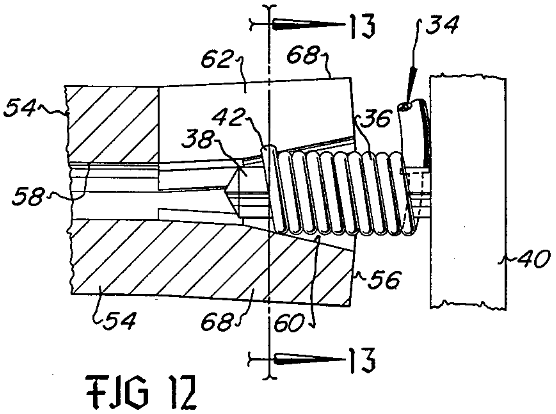
FIG. 12 is a side view, in section, of the bit shown in FIGS. 8 through 11 taken along the line 12—12 of FIG. 13.
Figure 13:
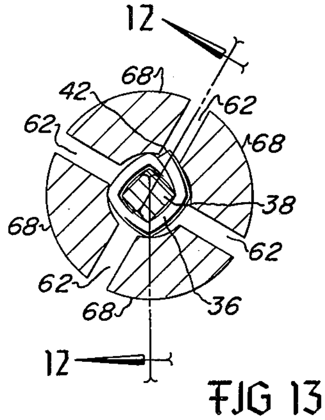
FIG. 13 is a section view taken along line 13—13 of FIG. 12.

The bit 54 is applied to the coiled conductor wire 36 as shown in FIG. 12 in a manner similar to operation of the bit 18. In applying the bit 54 to a conductor, however, greater axial pressure is exerted so that the jaws 68 formed between the slots 62 are forced to spread slightly radially outwardly with respect to the longitudinal central axis of the bit to thereby forceably engage the first one or two coils of the wrapped conductor. The bit 54 is then rotated in the direction opposite to the direction in which the conductor was wrapped on the terminal 38 so that the distal end 42 of the conductor becomes lodged in one of the slots 62 in a manner similar to the bit 18.

The bit 54 is then further rotated until the coils of the wrapped conductor are substantially loosened from a tight gripping relationship on the terminal. Even though the first one or two coils may remain engaged with the terminal because of the radial inward force of the jaws 68 the conductor may be easily removed from the terminal once the remaining coils are enlarged by the unwinding action of the bit by merely withdrawing the bit axially from the terminal.

The bit 54 should be proportioned such that the jaws 68 are suitably resiliently deformable. Moreover, resiliency may be provided by a proper selection of material of which the bit is made. A preferred material is one of the glass fiber reinforced thermoplastics such as polyphenylene sulfide or nylon.

Figure 15:
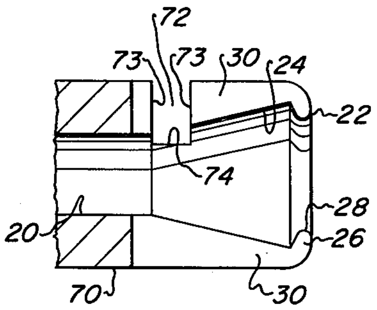
Figure 14:
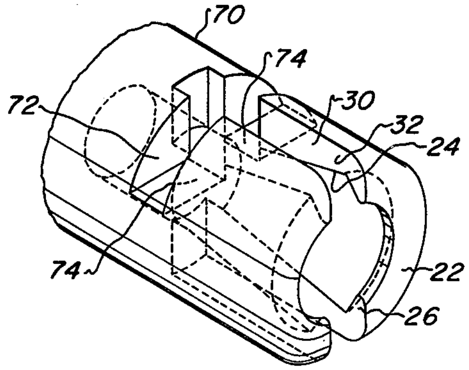
FIG. 14 is a perspective view of a bit in accordance with a third embodiment of the present invention; and, FIG. 15 is a longitudinal center section view of the bit shown in FIG. 14.

A third embodiment of the present invention is shown in FIGS. 14 and 15. The third embodiment comprises a cylindrical bit 70 similar to the bit 18 shown in FIGS. 1 through 7 but being further characterized by a transverse slot 72 having a rectangular cross sectional shape and spaced from the end face 22. The slot 72 is actually formed as two slots intersected by one of the slots 30. The slot 72 intersects the periphery of the bit 70 as well as the conical recess 24 and forms opposed parallel side walls 73. One longitudinal side of the slot 72 may preferably coincide with the intersection of the conical recess 24 and the bore 20. The intersection of the bottom wall of the slot 72 with the conical recess 24 forms ledges 74, one shown in FIG. 15, which are perpendicular to the surfaces 32 and are operable to engage the distal end of a conductor wire coiled around a terminal when the bit is placed over a wrapped connection in the manner shown in FIGS. 5, 6, and 7 for the bit 18. As the bit is further rotated the end of the wire tends to protrude further into the slot 72 on one side or the other of slot 30, depending on the direction of rotation and the "hand" of the wrapped connection, whereby the wire becomes firmly engaged with the bit to facilitate the unwrapping process. The bit 70 is adapted to unwrap connections wherein the end of the wire does not protrude radially outward from the adjacent coils as is normally the case. Accordingly, for tightly wrapped connections wherein the end of the wire has been wiped down or pressed tightly against the terminal the bit 70 may be better suited for unwrapping the wire coils than the bits 18 or 54.

I claim:

1. A device for unwrapping a flexible conductor wire from a terminal pin wherein the conductor wire is wound on said terminal pin in a series of helical convolutions, said device comprising a rotatable bit characterized by:
- a shank portion having a transverse end face;
- a longitudinal terminal receiving bore in said bit opening to said end face;
- a generally conical shaped recess formed in said bit converging from said end face toward said bore and adapted to engage one or more convolutions of said conductor wire;
- at least one longitudinal slot formed by a pair of opposed surfaces each intersecting said recess; and,
- a substantially transverse slot intersecting said longitudinal slot and said recess and having a bottom wall forming a ledge for engaging the distal end of said conductor wire, so that upon rotation of said bit said helical convolutions are loosened from tight engagement with said terminal pin.

2. The invention set forth in claim 1 wherein:
- said slot intersects said recess in such a way as to form two opposed ledges for engaging said conductor wire, respectively, depending on which direction said conductor wire is wound on said terminal.

3. A device for unwrapping a flexible conductor wire from a terminal pin wherein the conductor wire is wound on said terminal pin in a series of helical convolutions, said device comprising a rotatable bit characterized by:
- a shank portion having a transverse end face;
- a longitudinal terminal receiving bore in said bit opening to said end face;
- a generally conical shaped recess formed in said bit converging from said end face toward said bore and adapted to engage one or more convolutions of said conductor wire; and,
- means forming a transverse slot intersecting said recess in such a way as to form a ledge for engaging the distal end of said conductor wire so that upon rotation of said bit said helical convolutions are loosened from tight engagement with said terminal pin.

4. The invention set forth in claim 3, wherein:
- said slot includes a bottom wall intersecting said recess in such a way as to form two opposed ledges for engaging said distal end of said conductor wire, respectively, depending on which direction said conductor wire is wound on said terminal.

* * * * *